Figure 5:
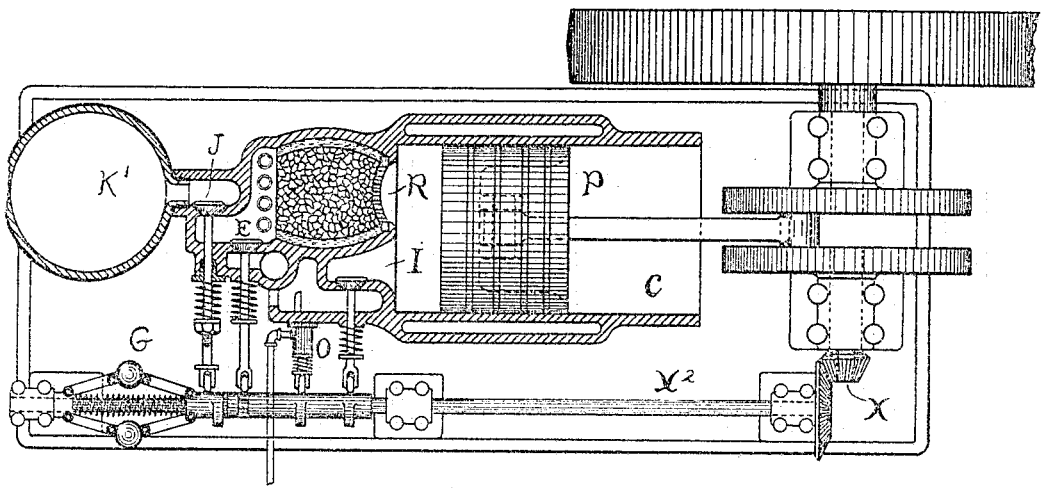

No. 781,921. PATENTED FEB. 7, 1905.
E. THOMSON.
GAS OR FUEL ENGINE.
APPLICATION FILED FEB. 14, 1898.
3 SHEETS—SHEET 1.
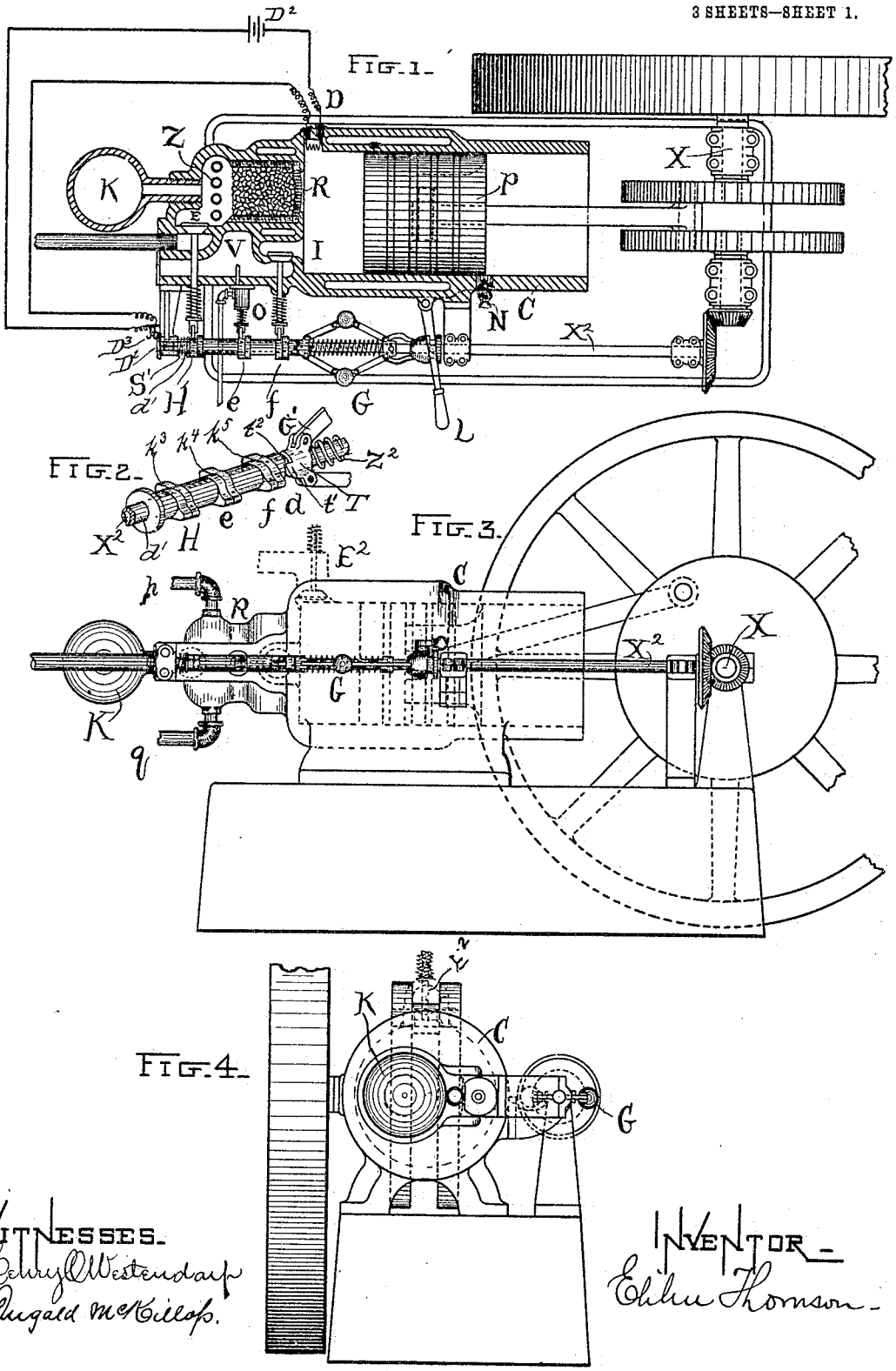
WITNESSES.
INVENTOR.

No. 781,921. PATENTED FEB. 7, 1905.
E. THOMSON.
GAS OR FUEL ENGINE.
APPLICATION FILED FEB. 14, 1898.

3 SHEETS—SHEET 2.

WITNESSES.
Henry Westendarp.
Dugald McKillop.

INVENTOR
Elihu Thomson

No. 781,921. PATENTED FEB. 7, 1905.
E. THOMSON.
GAS OR FUEL ENGINE.
APPLICATION FILED FEB. 14, 1898.
3 SHEETS—SHEET 3.
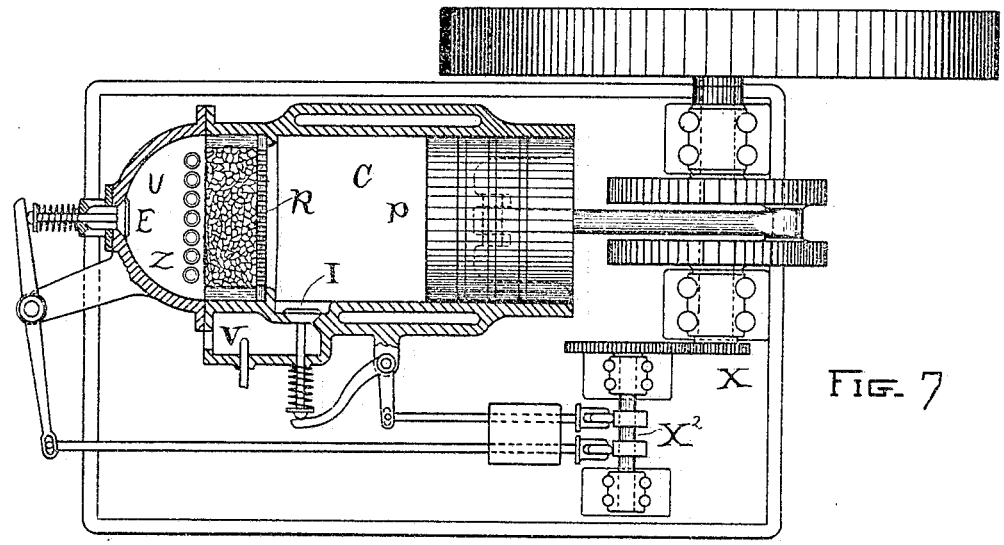
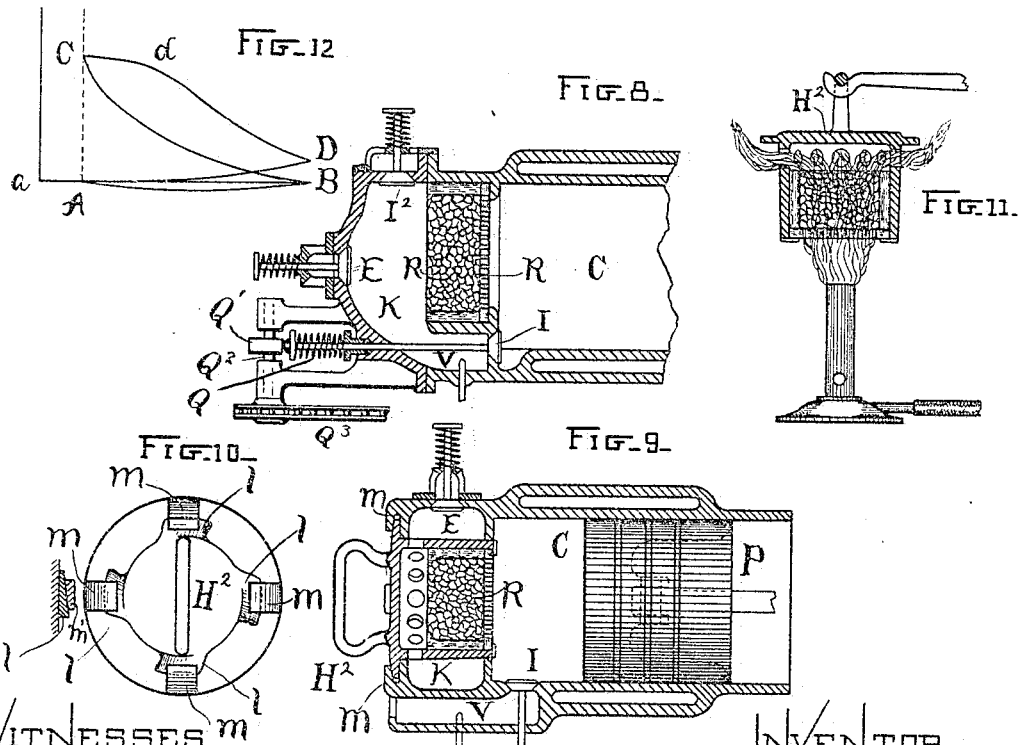
WITNESSES
Henry A. Westendarp.
Dugald McKillop.
INVENTOR
Elihu Thomson No. 781,921. Patented February 7, 1905.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

GAS OR FUEL ENGINE.

SPECIFICATION forming part of Letters Patent No. 781,921, dated February 7, 1905.

Application filed February 14, 1898. Serial No. 670,222.

*To all whom it may concern:*

Be it known that I, ELIHU THOMSON, a citizen of the United States, residing in the town of Swampscott, county of Essex, and State of Massachusetts, have invented a new and useful Improvement in Gas or Fuel Engines, of which the following is a specification.

The object of my invention is to secure freedom from explosion in gas or other fuel engines and to prevent preignition; also, I aim to obtain more perfect combustion, to lessen the need of water-jacketing of the cylinder or cylinders, and to employ a regenerator in conserving heat.

To this end I have invented a new cycle of operations which can be carried out in various forms of engines, one of the simplest of which I employ in illustration of the features of my invention. The engine itself, as hereinafter described, has novel features, which will be described and claimed. The engine shown has a single power-cylinder; but it is to be understood that these may be duplicated in the same structure, as usual with other forms of engines.

Briefly, the cycle of operations in my invention is as follows:

First. Outward motion of a piston draws into the cylinder-space back of it a mixture of gas, vapor, or combustible and air in excess either cold or at but little elevation of temperature. This mixture is made too poor to explode or burn freely—that is, the excess of air is enough to prevent the mixture being explosive.

Second. The inward or return stroke of the piston drives the mixture through a hot regenerator of refractory plates, slabs, or granules mounted at the back of the cylinder. The mixture burns as it passes through the hot material of the regenerator, and the heat of combustion is given to the regenerator material nearest the cylinder. The burned gases pass farther on in the regenerator and give up most of their heat and may, if desired, be cooled by water-tubes suitably placed at the back of the regenerator. After passing the regenerator the gases are caught in a closed chamber of such size as will give, together with the space in the regenerator and the unavoidable clearance of the piston, the desired compression to the gases.

Third. On the piston again moving outward the compressed gases are reheated and expanded greatly in going through the regenerator the reverse way and filling the cylinder while expanding. This continues until the piston is fully out, and is the power-stroke.

Fourth. The exhaust-valve now opens and lets the gases escape during the inward stroke of the piston. They may in thus escaping pass again through the regenerator and give up some of their heat to it.

The cycle is then again repeated, and so on; but it is easily seen that even if the fuel be much diminished or cut off the strokes which produce power may continue, but in a weakened way, while there is sufficient action of the regenerator, owing to its containing a front zone of high temperature, also it will be seen that the combustible passes the regenerator at least twice, and three times if the exhaust is made through the regenerator. This insures most perfect combustion in excess of air and gives an odorless exhaust. The regenerator also acts in a measure as a muffler for the exhaust gases in this case. No flame touches the cylinder-walls during action, and there is no liability to preignition or explosion and no shock.

I will now describe my invention by reference to the accompanying figures.

Figure 6:
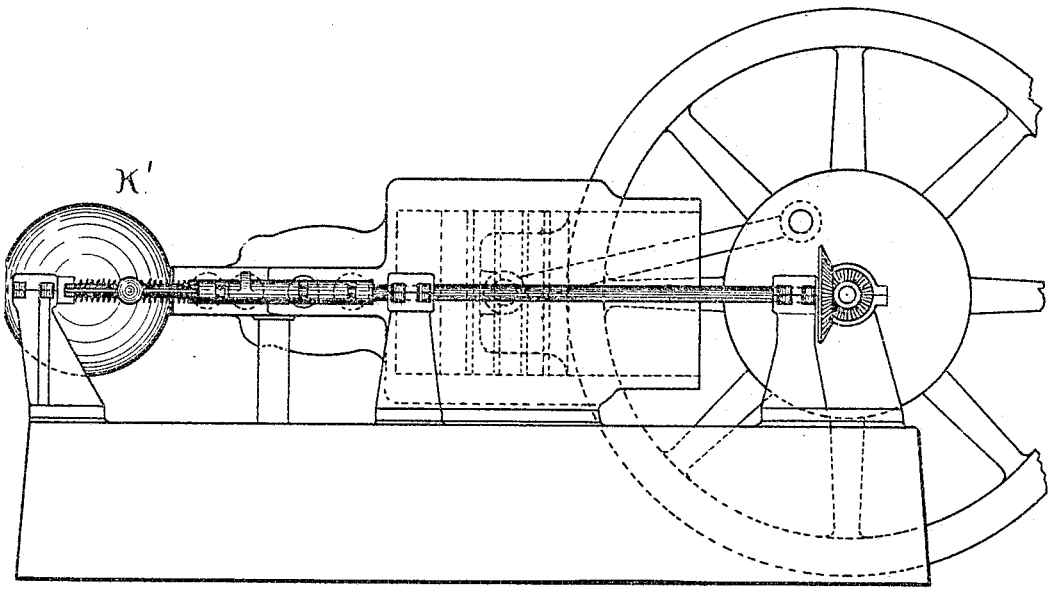

Figure 1 is a plan outline, partly in section, of an engine embodying the invention. Fig. 2 is an enlarged and separate view of the part of the cam-shaft with the cams thereon. Fig. 3 is a side elevation of an engine similar to the one shown in Fig. 1, except that the exhaust is so arranged that it does not pass through the regenerator. Fig. 4 is an end view. Fig. 5 is a modification in plan. Fig. 6 is an elevation of the same. Fig. 7 is another form of the engine; Fig. 8, another modified arrangement. Figs. 9, 10, and 11 illustrate constructions to facilitate starting. Fig. 12 is a diagram of pressures.

In Fig. 1, C is the cylinder; P, the piston working therein and turning the shaft X in the usual way. The piston P has but little clearance at the end of its inward stroke. The cylinder C in large engines may be water-jacketed or otherwise cooled. In small engines the radiation and air convection outside may suffice. R is a regenerator packed with refractory material, such as pebbles or small granules of fire-clay hard baked. The part farthest from the cylinder may, however, be packed with gauze or perforated plates of iron or nickel, or with granules of metal, such as cast-iron or of nickel, as it never reaches a very high temperature. In some cases the extreme back of the regenerator R may be supplemented for completing the cooling by water-cooled plates, or it may have tubes conveying cooling-water and located in the gas-stream. These are indicated at Z in the figure. I is the inlet-valve for entrance of air mixed with combustible gas or vapor in a chamber V, which may be heated and perform the function of a vaporizer where oil is used. The supply of gas or vapor is so proportioned that the mixture even upon coming in contact with a red-hot surface does not explode, the air being in sufficient excess. The oil-supply pump O may be employed for feeding a proper quantity of oil to the vaporizer V. E is the exhaust-valve for controlling the exit of gases. K is an expansion or space back of the generator R, adding to the volume of untraversed space or total clearance. Any suitable valve mechanism may be employed to work the valves in proper order—such as a cam-shaft $X^2$, driven at one-half the speed of X, which is provided with cams $f$ and H, controlling, respectively, valves I and E. A suitable governor G may control the speed of the engine by rendering the cams idle at any predetermined speed limit to stop the intake of fuel or air, or both, as desired.

Fig. 2 shows portions of the ball-carrying lever G' of the governor G, which are hinged to the sliding sleeve T, whose movement is opposed by the spring $Z^2$. The sliding sleeve T is provided with a projection or tooth $t'$, which with the parts in normal position engages a projection or tooth $t^2$ on the cam-carrying sleeve $d$. By this arrangement when the governor acts the teeth $t'$ or $t^2$ disengage, whereupon the cam-carrying sleeve will cease to revolve and the valves remain closed until the speed of the engine becomes normal. An additional cam may be provided, as at $e$, for working the oil-pump O, which is simultaneously discontinued, when by the centrifugal action of the governor the cam-carrying sleeve is allowed to remain at rest while the shaft $X^2$ rotates. A second set of cams $h^3$ $h^4$ $h^5$ are provided on the sleeve $d$, which are arranged, respectively, on corresponding sides of the cams H $e$ $f$ and are used in the operation of starting the engine, as will be explained hereinafter.

To start the engine, the part of the regenerator nearest the cylinder-space must be brought to a red heat or higher. To do this, I may temporarily bring into action the second set of cams on the cam-shaft, so as to open the inlet-valve I at every forward stroke of the piston and an opening of the exhaust-valve E at every return stroke and at the same time feed an excess of oil at each intake stroke by causing the oil-pump O to act through a longer distance and at every revolution during the intake. For this purpose the cam-carrying sleeve is manually adjustable. An operating-lever L is provided, which loosely connects with a sliding cone on the governor-shaft and transmits motion through the governor to the cam-carrying sleeve. The lever is adapted to move the sleeve to the left against the tension of the compression-spring S', which latter is arranged on the sleeve extension $d'$ and tends to maintain the sleeve in that position at which the cams $f$ $e$ H will operate the valves and pump. Thus by moving the lever L to the left the second set of cams are substituted for the regular working cams, so that the valve I is opened on each intake and the pump O operated to deliver sufficient oil to form an explosive mixture at each intake, while valve E may be kept open during each return stroke. Assume, then, that an intake stroke has been made and that the oil-vaper in chamber V has passed through the open valve I and has mixed with a sufficient quantity of air to cause it to burn explosively. If while this mixture exists in cylinder C and the piston has reached its greatest distance outward the mixture be fired and the exhaust-valve E opened, the fire will blow through the regenerator R and strongly heat its contents. The firing may be accomplished in any suitable way, such as by an electrical igniter or spark-plug D, connected in circuit with the battery D', which circuit is opened and closed by any suitable switch or contact device, such as a double-contact cam $D^2$ on the sleeve extension $d'$ and spring-contacts $D^3$, between which the cam wipes as the sleeve revolves, and the spark produced by the plug D ignites the mixture at a predetermined point. It will be seen that the double-contact cam $D^2$ moves with the cam-carrying sleeve, so that when the mixture is explosive the circuit-closing device is operating and is otherwise when the mixture is non-explosive. For igniting the mixture in another way an opening N may be provided in the wall of the cylinder, which is just uncovered at the conclusion of the outward stroke of the piston P, whereby a flame from a torch held near said opening is drawn in and fires the mixture within the cylinder. A few such flame-strokes will bring the face of the regenerator R presented to the cylinder-space to a sufficiently-high temperature. As soon as the regenerator R is sufficiently heated the handle L is moved to the right, which allows the governor G to resume its expanded condition and permits also the spring S' to push the cam-carrying sleeve to the right to bring into action the regular working cams to perform the normal cycle. When electrical ignition is employed as described, this movement of the sleeve to the right moves the contact-cam D² to a position where it will not wipe the spring-contacts D³ as it revolves. With the parts in their normal position the piston P moves forward, the valve I is opened, and exhaust-valve E kept closed. The pump O supplies combustible to the vaporizer in insufficient amounts to produce an explosive mixture in the cylinder C. This non-explosive mixture is, however, on the return or compression stroke, with the valves I and E closed, compressed and driven through the hot regenerator R, and the heat of the mass causes a union of the combustible and the oxygen of the air, highly heating the already hot zone of the regenerator R.

The arrangement of the cams $f$, $e$, and H is made, as will be understood, to give the valves and supply-pump O the requisite movements in proper sequence. Where gas is used as a fuel instead of oil, the supply-pump O would, of course, be substituted by a valve controlling the entrance of gas to mix with the air drawn in. The gas which goes through the regenerator on the return or compression stroke gives up its heat to the cooler parts of the same farther from the cylinder-space and is comprssed into the free space K. The piston P is subjected during this action only to the pressure in K as a back pressure. At the conclusion of this stroke the compression of the gases in the regenerator R and in K will be the same and both be at a maximum depending chiefly upon the volume which these spaces at R and K and its connections bears to that of the cylinder-space traversed by the piston. On the second outward stroke the gases in K expand and drive the piston, receiving heat from the regenerator R during their passage from K and R. The work-pressure will have fallen to its minimum at the end of this the power stroke. Next follows the exhaust-stroke, and the opening of valve E takes place while the hot gases again pass the regenerator, giving off some heat to its cooler portions. Where the expansion has cooled the gases during the power-stroke so far that they contain but little heat which could be utilized, the exhaust-valve is located nearer the cylinder C and has direct communication with the same, but not through the regenerator. The valve E², Fig. 3, may in such a case be provided instead of E and allow the exhaust-gases free exit when opened by similar mechanism on the return stroke.

Any suitable valve-gearing may be employed to work the valves in proper sequence, and the mechanism indicated is intended simply as illustrative, as it may be very widely modified provided it gives a proper motion.

The governor G, for instance, is shown as being capable of disengaging at its high-speed limit from the cam-bearing sleeve, allowing said sleeve to fail to rotate and reëngaging therewith upon return to normal space. Other engaging and disengaging devices may, however, be employed, and here again it may be said that the only necessary function is that proper provision be employed for the purpose of preventing the engine from running away.

Fig. 3 is a side elevation of a slight modification and needs but little explanation, as it will be understood by reference to Fig. 1. Similar parts are marked by similar letters. The pipes $h$ $q$ shown in this figure are the connections for entrance and exit of cooling-water to the tube system Z back of the regenerator, which may be either a coiled pipe or a set of pipes jointed together or may be a sheet of perforated metal or other device for cooling the gas which passes it, such a cooling arrangement being provided with passages in any suitable manner for water-circulation. The end view of the engine shown in Fig. 4 is also provided with similar letters of reference where similar parts are shown. The exhaust-valve E² is situated within the cylinder and in such a position that the waste products of combustion do not have to pass through the regenerator. The exhaust-pipe into which the products of combustion pass from the valve is shown in dotted lines for the purpose of illustration. I may combine this with an exhaust-pipe which receives some of the products of combustion after they pass through the regenerator.

In Fig. 5 the regenerator R is shown as having a refractory face of hard baked clay with small perforations all over its extent. Back of this the packing is made of fine granules, &c., as before stated, although the regenerator-filling may be very widely varied. The regenerator-space is lined with fire-brick to prevent too much loss to and through its walls. There is shown in Fig. 5 a reservoir for gases which are compressing on the compression-stroke. In this case a valve J controls the communication between the regenerator R and the reservoir K'. This valve J opens as soon as the pressure in R exceeds that in K'—i. e., the valve J opens as soon as the pressure in R exceeds that in K' during the compression-stroke. During the following or power stroke the valve J is kept open for a period which may vary with the work which is demanded of the engine. It may therefore be worked by variable cut-off mechanism, as in a steam-engine and for a similar purpose, or it may be operated by a special cam on the cam-shaft, the purpose and arrangement of which is to keep the valve J open as long as may be necessary during the power-stroke. Except for this arrangement the mechanism in Fig. 5 is substantially the same as that in former figures without double set of cams, a single set controlled by the governor G being employed to open the valves in the proper sequence, the valves being returned to their seats by suitable springs, as indicated in the figure.

Fig. 6 shows simply a side elevation of the arrangement of Fig. 5, but outside of the features just pointed out in relation to Fig. 5 nothing further is shown.

In Fig. 7 the regenerator R is widened to cover the whole end of the cylinder and a space is provided back of it for the compression-space corresponding to K in Fig. 1. The regenerator R might, in fact, be made of a thick slab of baked clay through which there has been formed fine, tortuous, or straight passages from front to back, or several such slabs might be laid together to form the whole structure and surrounded by a metal case. Where the effectiveness of the regenerator R is very great in distributing and giving back heat, as when its structure is extremely fine, the addition of the water cooling-tubes back of it at Z might be dispensed with. The valve mechanism in Fig. 7 is driven by a cam-shaft $X^2$, geared one to two with respect to shaft X. No governor is shown, simply levers and rods acting on the spring-seat valves directly to open them in the proper order. A steady supply of oil or gas may be allowed to pass into the vaporizer V, which is taken up at every intake stroke and mixed in the cylinder. The regulation of this supply may be made to provide the non-explosive mixture with air in excess before mentioned. If the regenerator R be heated sufficiently for the start, the operation is substantially the same as in Fig. 1.

In Fig. 8 the air-inlet valve $I^2$ supplements valve I and provides that the entering cold air shall sweep the clearance-space back of the regenerator R. During the intake air enters at valve $I^2$, which is kept open simultaneously with I, and mixes with oil, vapor, or gas at V. This results in cooling the space back of the regenerator and filling the same with air. A little air from the intake passes from valve $I^2$ to the cylinder C through the regenerator; but this is a small amount of the whole, as this flow is opposed by the resistance of the fine structure of the regenerator.

In Figs. 9 and 10 is shown a detachable regenerator R, which by means of an operating-handle $H^2$ may be removed and heated preparatory to starting the engine. Suitable sloping lugs $l$ may be provided around the back plate of the case which carries the regenerator, Fig. 10, and which when the regenerator is in place engage under overhanging pieces $m$ on the cylinder. To detach the regenerator, it is necessary to give it a partial turn to the left, as may be seen from Fig. 10, when it may be drawn out on account of the disengagement of the lugs $l$ from over the underhanging pieces $m$. The regenerator may then be supported in position, as shown in Fig. 11, to be heated by a blowpipe, gas-jet, or other means, after which it may be quickly returned to the cylinder, and the engine is at once started. The spaces around the regenerator in this case (marked $k$) take the place of the space K, Fig. 1. It is of course important that in inserting regenerator R a fairly tight fit be secured, so as not to greatly lead compressed gases. Proper openings are provided in the wall of the regenerator through which communication is provided between its interior and the space K, Fig. 9.

Various modifications may of course be made in the arrangement described, my invention consisting not so much in the particular mechanism as in the cycle of operations which the mechanism simply illustrates. The cycle of operations is shown by an indicated diagram, Fig. 12. This diagram is of course only an approximate expression of the actions. Starting at A, the beginning of the intake stroke, a slight fall of pressure below the atmospheric line $a$ B takes place. From B the curve back and up to C represents the compression, which is approximately adiabatic if the cooling of the gases back of the regenerator is good; otherwise the curve rises more abruptly and in any case reaches a maximum pressure at C at the end of the compression and combustion stroke. From C the subsequent reheating and expansion gives a curve showing a somewhat-sustained pressure during the early part of the stroke, as from C to $d$, and a subsequent fall to D. The form of these curves will vary with the proportion and relation of parts and only the latter part of the curve near D will approximate the adiabatic. The exhaust-stroke begins at D and continues at a certain slight pressure above atmosphere and is completed at A. The distance $a$ to A represents the proportion of total clearance volume in the regenerator and spaces acting to receive the compressed gases. When the reservoir K', Fig. 5, is used, the top of the curves B D and C $d$ is altered somewhat, depending on the time the valve T is kept open and upon other circumstances and proportions.

In connection with the preceding figures it has been stated that the combustion of the charge takes place as it is being driven through the heat-regenerator R on the compression-stroke. It is within the scope of my invention, however, to have the combustion effected in part only during the compression-stroke and finished on the outward or power stroke, and in certain cases this method of operations may be preferred. To this end a portion of the charge undergoing compression may be made to pass through a side passage to its location back of the regenerator, which passage is subsequently closed, and all the charge then passes through the material of the regenerator when the piston moves forward during the power-stroke. Thus in Fig. 8 the indrawn charge through the valves I² and I when the piston moves forward having received its mixture of combustible gas or vapor in V as it enters the cylinder C instead of being all sent through the regenerator R to the space K on the compression-stroke, as when the piston moves back with the valves I² and E closed, part of it may, by keeping the valve I open during the whole or portion of the compression-stroke, pass to the space K back of the regenerator without actually passing through R, while the other portion of the charge does pass through during the stroke. Immediately after the compression is effected the valve I is closed and the expansion and completion of the combustion of the charge takes place by the gas compressed in K passing forward through the regenerator R on the second outward motion of the piston or the power stroke, after which the second return stroke or exhaust stroke is made and the gas in the cylinder driven through the regenerator in the reverse way. In this case a portion might be allowed to shunt itself past valve I to the exhaust-valve open at E by keeping valve I open during a part or all of the return or exhaust stroke. It is to be understood that suitable mechanism is to be provided in such a case for controlling the opening and closing of valve I to accord with the above actions, and when the said valve I is worked by a cam the form given to the cam acting to open the valve as against a spring Q may be made such that the opening at the proper intervals is obtained. As shown, a cam Q' is provided which is mounted on a shaft Q², that is driven by a chain and belt Q³ or other equivalent means from the main shaft.

What I claim as new, and desire to secure by Letters Patent of the United States, is—

1. In a gas or oil engine, the combination of a cylinder-space, a piston moving therein, an inlet-valve for admitting a non-explosive mixture of combustible and air, a heated granular mass in open communication with the cylinder-space through which the mixture passes during the compression and repasses during the power stroke of the piston, and an outlet-opening from the cylinder for exhausting the burned products, substantially as described.

2. In a gas or oil engine, the combination of a cylinder and piston, mechanism for supplying the cylinder on the intake stroke of the piston with a non-explosive mixture of fuel and air, and later compressing it on the return stroke, and a heated granular mass which is always in open communication with the cylinder whereby the union of air and combustible is effected during the compression-stroke of the piston.

3. In a gas or oil engine, the combination of a cylinder, a piston moving within the cylinder for indrawing a charge of combustible in which the air is sufficiently in excess to render the charge non-explosive, and later compressing said charge on its return stroke, a body of hot material through which said charge is passed in whole or in part during the compression-stroke of the piston, the said body in open communication with the cylinder at all times, and mechanism for effecting the return of the charge through the hot material, during the power or outward motion of the piston.

4. The combination in a gas or oil engine of a cylinder-space, a valve for admitting gas, a piston suitably connected to the crank-shaft and arranged to compress a charge of gas in said cylinder-space, a refractory regenerator in open communication with the cylinder-space at all times and having fine passages or interstices therein through which the gases are forced during the motion of the piston, and a reservoir of constant size for receiving the compressed gases after passing the regenerator during the compression-stroke and returning them through the regenerator to the cylinder on the power-stroke.

5. In a gas or oil engine, a cylinder and piston suitably connected to a crank-shaft, with means such as an inlet-valve for admitting a non-explosive charge to the cylinder on the first forward stroke, means such as a body of hot material with interstices for burning such charge and storing the heat of combustion of the same during the return of the piston or compression of the charge, means for receiving and cooling such charge, means for again passing the compressed charge in a cool state to and through the hot material in which the heat is stored, said charge afteward passing in an expanded state to the cylinder, whereby the piston is given its power-stroke, and finally means, such as an exhaust-valve, for exhausting the waste gases on the second return or exhaust stroke, in combination with suitable means for opening and closing the valves, as described.

6. The combination in a gas or oil engine, of suitable admission-valves opened on the intake stroke for the admission of non-explosive mixture of gas or oil, or vapor and air, a refractory mass which is always in communication with the cylinder for burning such mixture, a receiver or space K into which the gases are compressed during the compression-stroke, and from which they expand through the regenerator during the power-stroke, and exhaust-passages and valves controlling same for the exhaust of the waste gases on the exhaust-stroke, substantially as described.

7. A gas or oil engine, in which a mixture of gas or hydrocarbon vapor and air is admitted during the intake stroke of the piston and compressed during the compression-stroke into a space at the back of the cylinder, and in which a refractory regenerator R exists between the cylinder-space and the compression-space, and a valve in a passage shunting the regenerator, and means for opening said valve and effecting communication between the cylinder-space and the compression-space, irrespective of the regenerator itself, during the whole or a part of the compression-stroke.

8. In an engine, the combination of a piston and cylinder, a regenerator and a compression-chamber communicating with the cylinder, means for delivering explosive or non-explosive charges into the cylinder, an igniter, and a device which in one position causes the said means to admit an explosive charge to the cylinder and the igniter to fire the charge, and in another position to admit a non-explosive charge to the cylinder and render the igniter inoperative.

9. In a gas or oil engine, the combination of a cylinder, a piston arranged to draw a charge of combustible into the cylinder on its outward stroke, means for insuring an excess of air in the combustible, a regenerator in open communication with the cylinder through which combustible is passed and burned on an inward stroke of the piston, a closed chamber located beyond the regenerator in which the gases are compressed, the said chamber and regenerator being always in open communication with the cylinder, so that on the power-stroke the gases can pass through them to the cylinder-space and be reheated, and an exhaust-valve which permits the piston on its return stroke to drive out the waste products.

10. In a gas or oil engine, the combination of a cylinder, a piston arranged to draw a charge of combustible into the cylinder, means for insuring an excess of air in the charge to prevent explosion, a heated regenerator which is open to the cylinder at all times, and is arranged to burn combustible as it is forced through it in one direction by the compression-stroke of the piston, and also to store the heat thereof and give it up as the combustible again passes into the cylinder on the power-stroke of the piston, and means for exhausting the cylinder.

11. In a gas or oil engine, the combination of a cylinder, a piston arranged to draw a charge of combustible into the cylinder, means for insuring an excess of air in the charge to prevent explosion, a heated regenerator which is open to the cylinder at all times, and is arranged to burn combustible as it is forced through it in one direction by the compression-stroke of the piston, and also to store the heat thereof and give it up as the combustible again passes into the cylinder on the power-stroke of the piston, means for cooling the combustible after it has been forced through the regenerator on the compression-stroke, and a valve for exhausting the cylinder.

12. In an engine of the class described, the combination of a means for controlling the proportions of combustible and air to produce explosive or non-explosive charges, a valve for admitting the charges into the cylinder, an igniter for firing the explosive charges, and means for simultaneously rendering the charges explosive and the igniter operative.

In witness whereof I have hereunder set my hand this 7th day of February, 1898.

ELIHU THOMSON.

Witnesses:
DUGALD MCKILLOP,
SYLVESTER BAXTER.